US011983477B2

(12) United States Patent
Reddy et al.

(10) Patent No.: US 11,983,477 B2
(45) Date of Patent: May 14, 2024

(54) ROUTING LAYER RE-OPTIMIZATION IN PHYSICAL SYNTHESIS

(71) Applicant: International Business Machines Corporation, Armonk, NY (US)

(72) Inventors: Lakshmi N. Reddy, Mount Kisco, NY (US); Ying Zhou, Austin, TX (US); Cindy S. Washburn, Poughquag, NY (US); Alexander Joel Suess, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 160 days.

(21) Appl. No.: 17/404,977

(22) Filed: Aug. 17, 2021

(65) Prior Publication Data
US 2023/0059055 A1 Feb. 23, 2023

(51) Int. Cl.
*G06F 30/394* (2020.01)
*G06F 30/3312* (2020.01)
*G06F 30/398* (2020.01)

(52) U.S. Cl.
CPC ........ *G06F 30/394* (2020.01); *G06F 30/3312* (2020.01); *G06F 30/398* (2020.01)

(58) Field of Classification Search
CPC .. G06F 30/394; G06F 30/3312; G06F 30/398; G06F 30/39; G06F 30/392; G06F 30/396; G06F 2119/12
USPC ...................................................... 716/100
See application file for complete search history.

(56) References Cited

U.S. PATENT DOCUMENTS

| | | |
|---|---|---|
| 6,295,636 B1 | 9/2001 | Dupenloup |
| 7,971,174 B1 | 6/2011 | Khalsa et al. |
| 9,659,133 B2 | 5/2017 | Lin et al. |
| 10,599,882 B1 | 3/2020 | Werkheiser et al. |
| 10,831,971 B1 | 11/2020 | Quay et al. |
| 10,997,352 B1 * | 5/2021 | Posser ................... G06F 30/327 |
| 2012/0054699 A1 | 3/2012 | Cho et al. |
| 2013/0086545 A1 | 4/2013 | Alpert et al. |

(Continued)

FOREIGN PATENT DOCUMENTS

WO 2009014750 A2 1/2009

OTHER PUBLICATIONS

Leo E. Geralla et al., Optimization of physically-aware synthesis for digital implementation flow, International Journal of Engineering & Technology. Apr. 7, 2018 (2.11):31-4.

(Continued)

*Primary Examiner* — Paul Dinh
(74) *Attorney, Agent, or Firm* — Samuel Waldbaum; Otterstedt & Kammer PLLC

(57) ABSTRACT

To increase the efficiency of electronic design automation, at an end point of physical design synthesis optimization flow for a putative integrated circuit design having a plurality of nets, identify at least one congested region in the putative integrated circuit design. Identify those of the nets of the putative integrated circuit design traversing through the at least one congested region, to obtain a plurality of candidate nets for demotion. Demote a plurality of selected nets, selected from the plurality of candidate nets for demotion, from an upper routing layer of the putative integrated circuit design to a lower routing layer of the putative integrated circuit design. At least some of the plurality of selected nets experience a loss of timing quality of result after the demoting.

18 Claims, 14 Drawing Sheets

(56) References Cited

U.S. PATENT DOCUMENTS

2016/0012172 A1* 1/2016 Folberth .............. G06F 30/394
716/113
2019/0065656 A1* 2/2019 Chakraborty ......... G06F 30/394

OTHER PUBLICATIONS

Gester, Michael, et al., Algorithms and data structures for fast and good VLSI routing, In DAC Design Automation Conference 2012 Jun. 3, 2012 (pp. 459-464). IEEE.
Wei, Yaoguang, et al. GLARE: Global and local wiring aware routability evaluation. In DAC Design Automation Conference 2012 Jun. 3, 2012 (pp. 768-773). IEEE.
Moffitt, Michael D. MaizeRouter: Engineering an effective global router. IEEE Transactions on Computer-Aided Design of Integrated Circuits and Systems. Oct. 21, 2008;27(11):2017-26.

* cited by examiner

H Layer: Wire Width: 128. Capacity: 2

Net 1: Slack -10ps
Net 2: Slack -10ps

D Layer: Wire Width: 80. Capacity: 3

Net 3 : Slack -10ps
Net 4 : Slack -50ps
Net 5 : Slack -10ps

ROUTING LAYER RE-OPTIMIZATION IN PHYSICAL SYNTHESIS

BACKGROUND

The present invention relates to the electrical, electronic, and computer arts, and more specifically, to semiconductor Electronic Design Automation (EDA) and the like.

In VLSI (very large-scale integration) digital design, fabricated devices conventionally include millions of transistors implementing hundreds of storage devices, functional logic circuits, and the like. EDA involves the use of software tools for designing electronic systems such as integrated circuits (ICs) (e.g., VLSI circuits) and printed circuit boards. The designs are often segmented or partitioned into sub-blocks (such as cores, units, macros, sub-hierarchies, and the like) to make the design process more manageable.

Routing congestion is a pertinent topic as technology shrinks to smaller devices while design sizes keep growing. Existing routing layer assignment (in a typical physical synthesis process) may be inefficient due to various reasons, such as: the accuracy of the optimization environment varies when going through the physical synthesis flow (timing critical regions may shift around, making paths more or less critical); and/or there is a need to optimize multiple objectives such as improving timing, decreasing area and/or power, reducing congestion, and/or fixing electrical violations. These reasons for inefficiency may lead to sub-optimal thick metal layer assignments, which in turn leads to inferior timing quality of result (QOR) and/or routing congestion.

SUMMARY

Principles of the invention provide techniques for routing layer re-optimization in physical synthesis. In one aspect, an exemplary method for increasing the efficiency of electronic design automation includes, at an end point of physical design synthesis optimization flow for a putative integrated circuit design having a plurality of nets, identifying at least one congested region in the putative integrated circuit design; identifying those of the nets of the putative integrated circuit design traversing through the at least one congested region, to obtain a plurality of candidate nets for demotion; and demoting a plurality of selected nets, selected from the plurality of candidate nets for demotion, from an upper routing layer of the putative integrated circuit design to a lower routing layer of the putative integrated circuit design, wherein at least some of the plurality of selected nets experience a loss of timing quality of result after the demoting.

In another aspect, an exemplary computer includes a memory; and at least one processor, coupled to the memory, and operative to increase the efficiency of electronic design automation by: at an end point of physical design synthesis optimization flow for a putative integrated circuit design having a plurality of nets, identifying at least one congested region in the putative integrated circuit design; identifying those of the nets of the putative integrated circuit design traversing through the at least one congested region, to obtain a plurality of candidate nets for demotion; and demoting a plurality of selected nets, selected from the plurality of candidate nets for demotion, from an upper routing layer of the putative integrated circuit design to a lower routing layer of the putative integrated circuit design, wherein at least some of the plurality of selected nets experience a loss of timing quality of result after the demoting.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. Some embodiments may not have these potential advantages and these potential advantages are not necessarily required of all embodiments. For example, one or more embodiments provide one or more of:

improve the technological process of designing integrated circuits by enhancing timing quality of result and/or keeping congestion under control;

improve the performance of a computer carrying out EDA by reducing runtime and/or memory requirements (otherwise congested designs require undesirable iterations, re-running of tools with alternative settings, and the like; furthermore, for non-congested designs, one or more embodiments require less work for timing closure than prior art techniques);

improve the technological process of designing integrated circuits by providing an opportunity to correct/improve layer assignment and reduce congestion;

improve the technological process of designing integrated circuits by providing more efficient thick metal layer routing resource usage on critical nets, leading to congestion mitigation and/or timing improvements;

in some cases, may make hitherto un-routable designs integrated circuit designs routable;

in at least some cases, for fixed computer resources, improve the quality of an integrated circuit design as compared to a circuit design using prior art techniques.

These and other features and advantages of the present invention will become apparent from the following detailed description of illustrative embodiments thereof, which is to be read in connection with the accompanying drawings.

DETAILED DESCRIPTION

Figure 1:
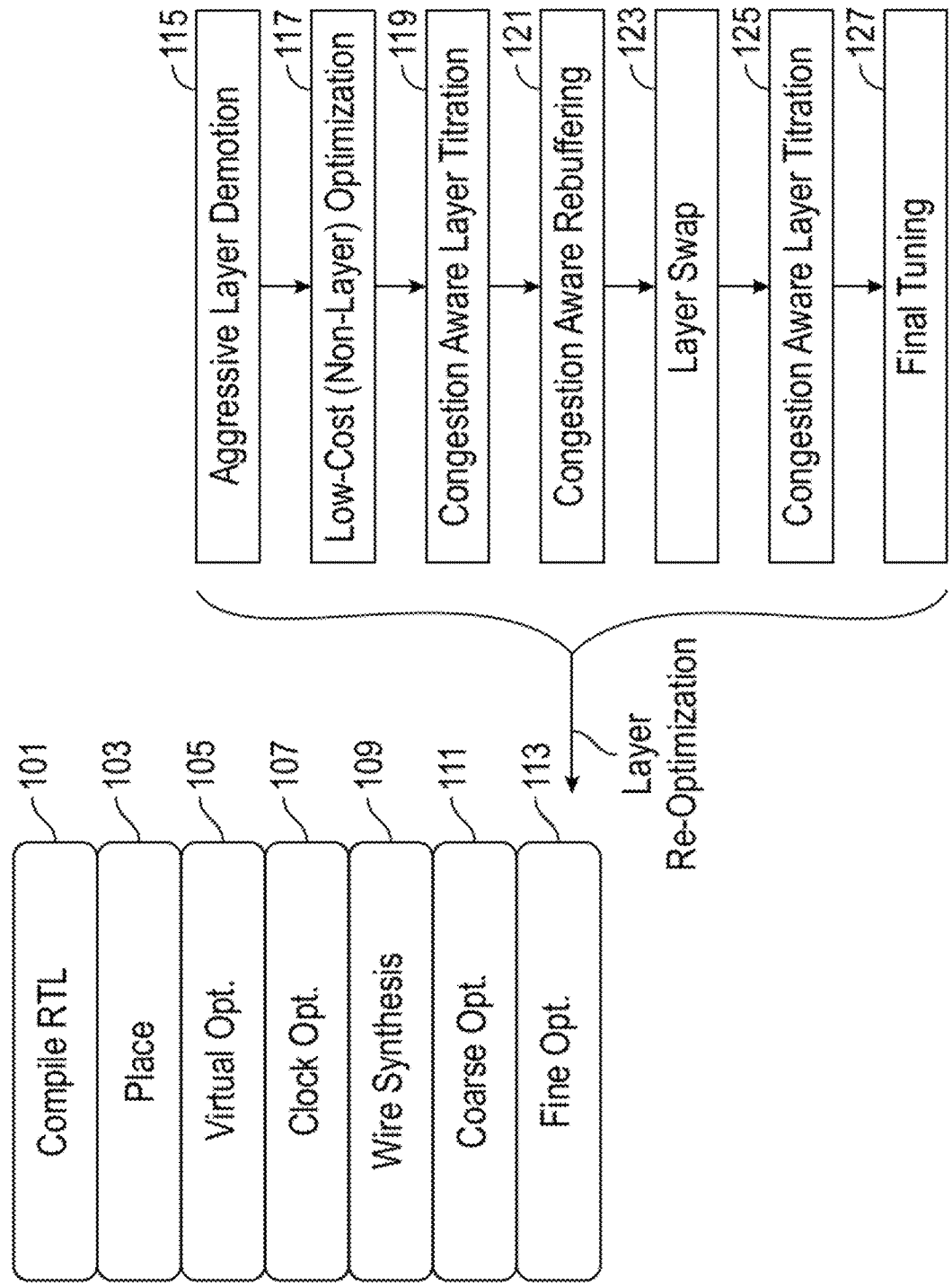
FIG. 1 shows an example of layer re-optimization in accordance with an exemplary embodiment, inside a larger EDA context.

As noted, routing congestion is a pertinent topic as technology shrinks to smaller devices while design sizes keep growing. Existing routing layer assignment (in a typical physical synthesis process) may be inefficient due to various reasons, in turn leading to sub-optimal thick metal layer assignments and inferior timing quality of result (QOR) and/or routing congestion. Thus, one or more embodiments relate, for example, to VLSI tools, including tools for the physical synthesis process of synthesizing the design. Typically, obtain a gate-level description of the design: a designer codes up the design in VHDL or other high level language and it is translated to gate level. The tool synthesizes the design, places and sizes gates, connects the gates, and so on. The design must typically meet certain timing criteria. For example, a certain signal needs to go from point A to point B in a certain amount of time—when all such requirements are met for the circuit, this is known as timing closure. Typically, a minimum amount of margin in slack (say +2 or +5) (slack values herein are in picoseconds (ps) unless noted otherwise) is required, or else the design is not considered to be closed; however, margin is not necessarily required in all instances. There are other optimizations that are typically carried out, such as increasing gate size to make the gate more powerful or using a low threshold voltage ($V_t$) gate, which is faster at switching but also needs more power. As will be familiar to the skilled artisan, "slack," in the context of timing, refers to the margin between the data signal and the clock signal; if the data signal arrives with time to spare, there is positive timing slack (margin); if the data signal arrives just in time, there is zero timing slack; and if the data signal arrives too late, there is negative timing slack.

There are typically several layers of metal available to connect gates in an IC design. Typically, the wider the connection and the higher up the connection is in the layers, the faster the connection is. However, there are a limited number of these fast wires physically available in a design, and thus they should only be used where they are really needed and timing cannot be improved or closed using some other technique. If too many of the fast wires are used in a region, the region becomes congested and routing cannot be completed. If fast wires are underutilized, performance will suffer.

As a circuit design develops during the EDA process, it is initially very coarse, not well-described or well-placed. The design improves when moving through the steps of physical synthesis. It is typically not feasible to wait until the end of the design process to use fast upper layer resources; rather, it is appropriate to start assigning precious resources right at the start of the process. At the end of a standard physical synthesis process, layer assignment may not be optimized because decisions are made early-on when it is not known what the timing-critical regions will be. Furthermore, the physical synthesis ("phy syn") tool is not just employed for optimizing timing; it also is employed to ensure that too much area and/or power are not consumed, to avoid congestion, to avoid electrical violations, and the like. As a result, precious resources might be locked up in subcritical or non-critical regions. Therefore, resources are wasted and timing QOR is not as good as it could potentially be, and there may be congestion regions and/or hot spots. Typically, in phy syn, a complete wiring is not carried out, rather, a quick estimation program is employed. We have found that when a certain threshold usage is approached at this stage (for example, 92-93%, but other embodiments/applications could have a different value), routing difficulty will likely later arise during the "main" routing stage 3111 (discussed below with regard to FIG. 14). See US Patent Application Publication 2013-0086545A1, Charles J. Alpert et al., for a description of a suitable congestion evaluation technique. One or more embodiments are implemented within the timing closure block 3109 (discussed below with regard to FIG. 14), using estimated routes and congestion, while "main" routing is 3111.

Consider now PDS (Physical Design Synthesis) optimization flow. This includes incremental heuristic optimization (finding local optima), but typically not the most optimal solution at every point because of expense. There are typically multiple objectives, such as improving timing, fixing electrical violations, reducing congestion, reducing power and/or area, and the like. A primary objective is typically timing; as noted elsewhere herein, the process typically starts with a crude timing estimate and the timing gets more accurate as the process proceeds. There are typically variable accuracies. The virtual timer will yield pin-slews, then path-slew, and so on—more accurate timing estimates are more computationally expensive. As the process evolves, the timing-critical region typically keeps changing and/or shifting (as timing is estimated more accurately, the timing-critical region can be in the same physical space but the timing can change, or the timing critical region can move to a different physical location). This results in an accumulation of inefficiencies; some earlier changes and/or decisions may be unnecessary and/or invalid. Very large (e.g., hierarchical large block synthesis (HLBS) also known as hierarchical physical synthesis) designs may make these problems worse.

As noted elsewhere, upper/thicker routing layer resources are precious, and with current techniques, may be wasted or may not be used efficiently. The timing QOR may be sub-optimal and/or the design may be congested. Traditional approaches to fix such inefficiencies are typically conservative and while they may also be undertaken, for example, during timing closure stage 3109, unlike one or more embodiments, they typically do not allow degradation of the primary objective (timing).

When reaching the end of the PDS process, some estimate of the timing is typically available, before the layer demotion process according to one or more embodiments is entered. This provides a useful indication as to where timing later needs to be recovered. By way of a hypothetical illustrative example, suppose 100 nets are not closed on timing, before the point when layer demotion according to an embodiment of the present invention is employed. Suppose all the amounts by which these nets are missing on timing are summed, and the result is 1000; suppose also that there is 98% occupancy, so that congestion problems are also encountered. With demotion according to one or more embodiments, occupancy falls to 91-92% and the design becomes routable. However, the number of nets not meeting timing now increases to 200 and must be reduced back to 100 or preferably fewer; more generally, the sum 1000 may also degrade (e.g., to 2500). That is, the number of nets that are not closed on timing may increase or some nets that are already not closed may miss closure by larger amounts, or some combination of the preceding may occur.

Referring now to FIG. 1, routing layer (more generally, precious resource) optimization, in accordance with one or more embodiments, provides techniques for managing wire resources (or other precious resources) more efficiently. Advantageously, routing layer re-optimization in accordance with one or more embodiments provides a "second chance" to resolve the congestion issue and/or to improve or recover timing QOR while keeping congestion under control. In one or more embodiments, routing layer re-optimization is invoked late in the design optimization flow. FIG. 1 shows typical "phy syn" steps; RTL stands for register transfer level. In one or more embodiments, routing layer re-optimization is carried out during late (fine) timing optimization.

Furthermore in this regard, the exemplary overall process includes compiling the RTL at 101; placement at 103; virtual optimization at 105; clock optimization at 107; wire synthesis at 109; coarse optimization at 111; and fine optimization at 113. The skilled artisan will be familiar with the overall process. Furthermore in this regard, steps 101-113 in FIG. 1 represent one specific example, and may be compared to the more general process of FIG. 14 discussed in detail below. Placement 103 is analogous to step 3105 in FIG. 14; RTL compilation 101 is analogous to step 3103 in FIG. 14; steps 105 and 107 can be part of clock synthesis 3107; and steps 109, 111, and 113 can be part of timing closure 3109. Generally, layer re-optimization in FIG. 1 can occur near the end of timing closure; as noted, steps 101-113 in FIG. 1 represent one specific non-limiting example. One or more embodiments are implemented within the fine optimization stage 113. In particular, referring to steps 115-127, one or more embodiments implement layer-re-optimization within fine optimization stage 113.

In step 115, carry out aggressive layer demotion. In step 117, implement low-cost optimizations that do not involve layer assignment. In step 119, carry out congestion-aware layer titration. In step 121, carry out congestion-aware layer rebuffering. In step 123, carry out layer swapping. In step 125, carry out congestion-aware layer titration. In step 127, carry out final tuning. Note that layer titration is repeated in FIG. 1 but this need not necessarily be the case in every embodiment.

In routing layer re-optimization according to one or more embodiments, nets are aggressively demoted to lower layers in step 115; this is done without degrading the design's worst slack or worsening electrical violations, and typically provides immediate congestion mitigation. However, it typically also degrades timing QOR. We have found, however, that satisfactory results can be obtained in this regard with one or more appropriately strict layer demotion criteria. In one or more embodiments, the demotion is then followed by timing QOR recovery phases while trying to keep congestion under control. Thus, in one or more embodiments, this aspect addresses how to recover timing while controlling congestion. For example, employ low-cost non-layer optimizations in step 117 to improve timing, reducing demand for precious higher routing layers; employ gradual and/or controlled layer assignment and buffering that is incremental and congestion-aware, where layer resources are released gradually to limit usage; and/or leverage the rest of the optimization flow to improve timing QOR. As noted above, two titration steps 119, 125 are optional—we have found that steps 121 and 123 may significantly change the design and so it can be beneficial to repeat titration.

Furthermore in this regard, existing tools tend to be conservative, and may not shift an available upper layer wire from one net to a more critical net if timing is degraded or not closed. One or more embodiments provide techniques to more efficiently manage precious wire resources. Indeed, one or more embodiments provide a second chance at the end of Phy Syn (Phy Syn (sometimes called place and route) typically includes steps 3103-3109 in FIG. 14) to (i) resolve congestion issues and/or (ii) to recover/improve timing QOR (quality of result) while satisfying congestion. One or more embodiments find congested areas and aggressively demote nets from upper to lower layers. This improves congestion but typically degrades timing for the particular net. However, this is acceptable for non-critical nets. However, in the case of borderline nets, the slack may get worse. In one or more embodiments, very critical nets are not demoted because they will likely need a high-level layer eventually. Generally, one or more embodiments carry out large-scale demotion subject to a few rules. The nets with the worst slacks are not disturbed. Also, one or more embodiments do not take resources from nets if doing so would introduce or worsen electrical violations. One or more embodiments permit locally degrading slack, as long as the overall worst slack is not made worse (and subject, for example, to a few other conditions as discussed herein).

Regarding late-stage layer re-optimization according to one or more embodiments, an exemplary goal is congestion mitigation with similar or improved timing QOR. One or more embodiments provide an opportunity to reset, correct and/or improve layer assignment; for example, by shifting precious resources to more critical regions and/or to reduce usage. One or more embodiments control congestion in the process. This can pose some significant risk to timing QOR; however, a very congested design is hard to route and the existing timing QOR may not be realizable in practice. In one or more embodiments, the existing timing QOR (at the start of this process) provides a meaningful target for a "redo" process and/or allows a way to score or check the trade-offs. One or more embodiments provide more judicious usage of precious routing resources. For example, one or more embodiments reduce the resources needed by using cheaper optimizations (e.g., box movement, pin-swapping, low-cost repower to save upper layers, and the like) and/or correct underlying issues, such as bad locations, weak power levels, and the like.

Figure 2:
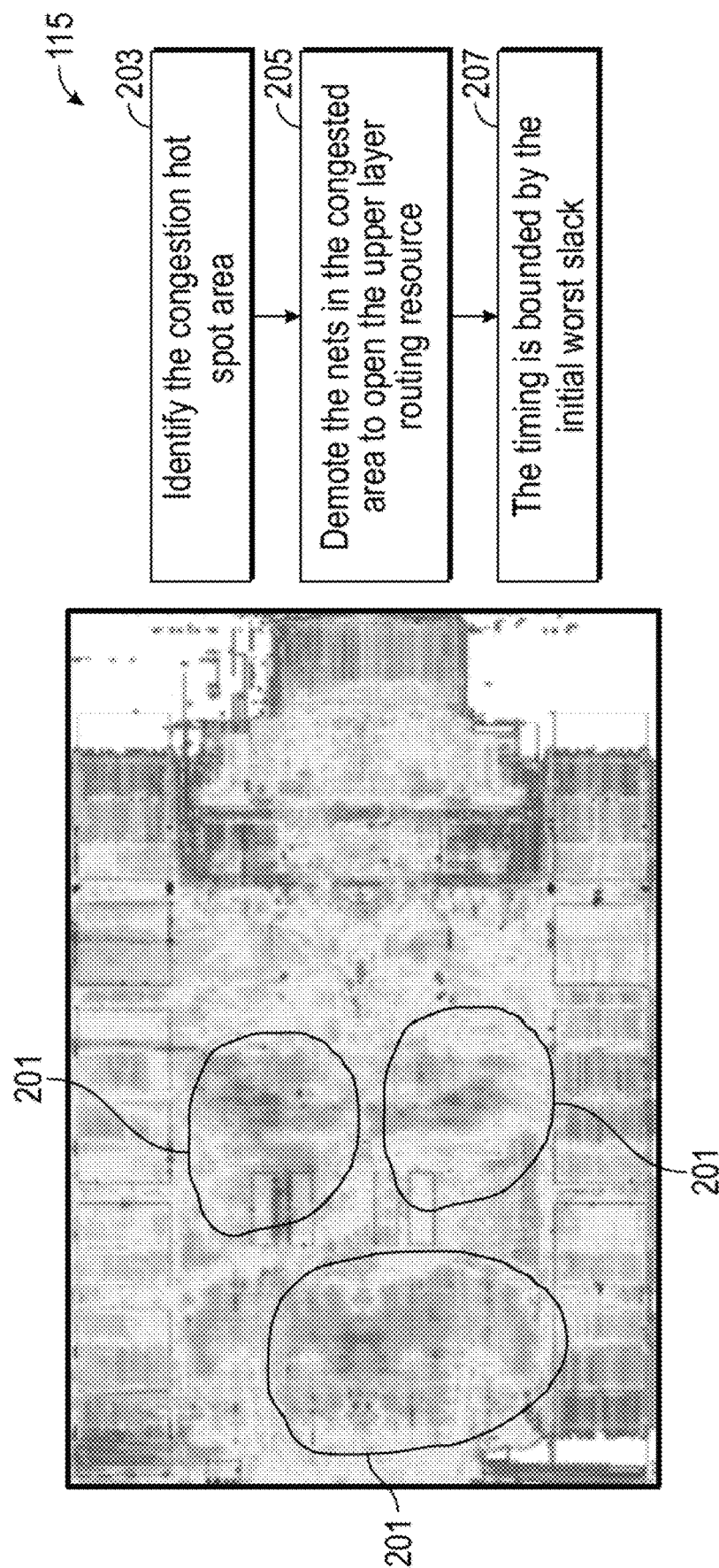
FIG. 2 shows a flow chart for aggressive layer demotion, and a sample congestion map, in accordance with an exemplary embodiment.

Referring to FIG. 2, in aggressive layer demotion 115, one or more embodiments only demote the nets in the congested regions 201 identified in step 203, to open the upper layer space for the timing critical nets via demotion as per step 205, while preventing large timing degradation (holding the line on slack degradations, preventing new electrical violations, and the like) in step 207, so that there will be less work needed to recover timing.

Figure 3:
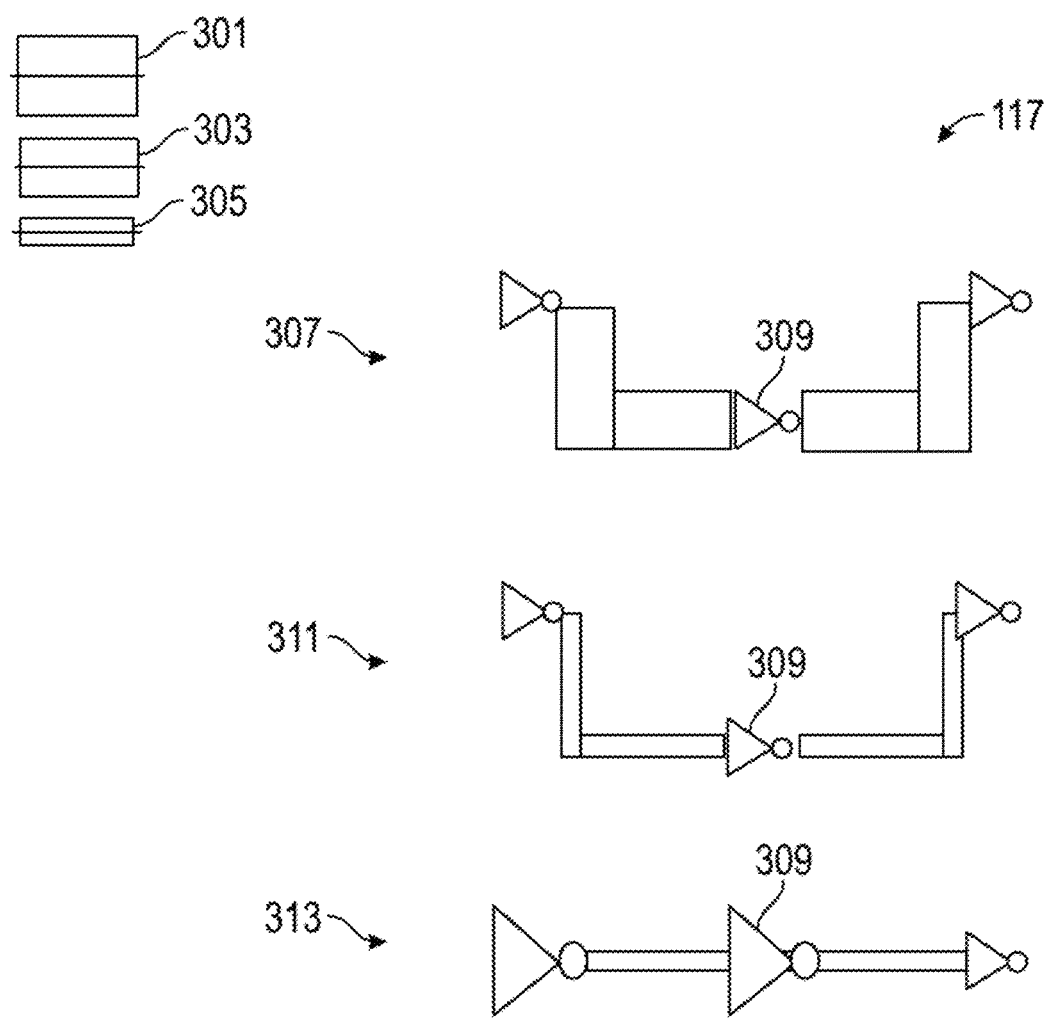
FIG. 3 shows reduction in higher layer usage using "cheaper" optimizations, in accordance with an exemplary embodiment.

Referring, for example, to FIG. 3, one or more embodiments employ low-cost non-layer optimizations 117 to improve timing. For example, after demotion, try (low area cost) drive strength tuning to determine whether it can improve timing. Try to relocate the cells to obtain straighter connections. In the example of FIG. 3, three routing layer traits available 301 (upper/widest), 303 (middle), 305 (narrowest/lowest) are available. In FIG. 3 and throughout this application, the wider the wire, the higher the layer. Thus, in this aspect, look for low-cost optimizations other than using precious layers to help timing. If these can reduce timing problems, the need for precious resources might go down. Also, wider/upper layer wires may have been used as a crutch; i.e., they may have masked an underlying problem such as an improperly placed gate. In FIG. 3, in the original (top) design state 307, the gate 309 is weak and the connection is detoured—the gate 309 has a bad location, weak power levels, and a −3 slack. After layer demotion (middle row) 311, the slack worsens to −15 slack. In the final (bottom) row 313, move the middle gate 309 so that the connection goes in a straight line and the wide wire 303 is not needed. In the example, also make one or more of the gates larger to improve timing. Now, in the last (bottom) row, the middle gate 309 is in a good location, has been powered-up, and the slack improves to −1, while saving higher layers. Even if these changes do not move the design all the way to a solution, they are beneficial.

Figure 4:
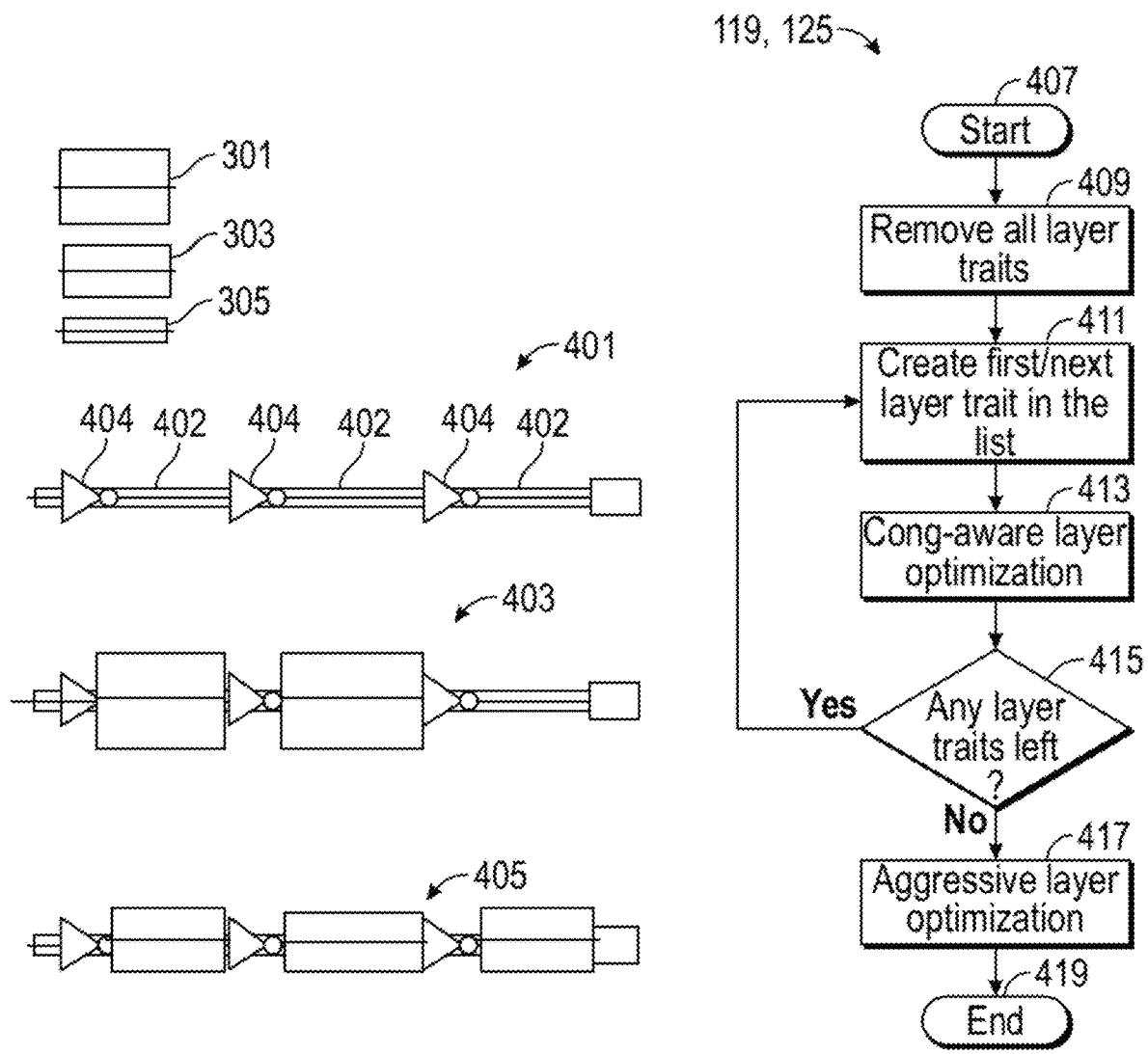
FIG. 4 shows layer titration, in accordance with an exemplary embodiment.

Referring to FIG. 4, consider a layer titration technique 119, 125, according to an aspect of the invention. In this aspect, gradually release one layer at a time and iterate on the next layer to see if it is sufficient; only release the next higher layer if the timing cannot be closed (i.e., if no satisfactory results with everything at lowest level, initially make only next highest level available). Three routing layer traits 301, 303, 305 are again available in this example as seen at the upper left-hand corner. As seen in view 401, the net is on the lowest layer after demotion in previous processing. The slack is −15. A portion of the net is promoted to the upper layer in view 403, improving the slack to −1. With layer titration, layer assignment is controlled more carefully. Suppose initially, only medium width wire 303 is available. When all the nets are processed, it may turn out that assigning all three segments of the net to the medium layer is good enough, as seen in view, 405 and there is no need to use the upper layer.

Referring now to the flow chart, which begins at 407, remove all the layer traits at step 409; i.e., assume all nets are on the lowest level. Create the first (or next, if a subsequent iteration) layer trait in step 411 and then carry out congestion-aware layer optimization in step 413. As per decision block 415, continue the loop until there are no more layer traits left. Then, carry out aggressive layer optimization at 417 and end at 419. In view 401, each segment 402 between inverters 404/endpoints is a net. It is desired to determine what layer each net should be given out of the three available choices 301, 303, 305. Current techniques typically visit each net, try each of the three choices, and pick the best one. In layer titration according to one or more embodiments, the technique does not permit all three choices at same time. Rather, start with the lowest layer as a default. Only allow upgrade from lowest layer 305 to next highest layer 303, initially. Then release highest layer 301 only for nets that are still not acceptable at layer 303. That is to say, initially locate everything at the lowest level 305. For nets are not acceptable at layer 305, only allow an upgrade to the next highest level 303. Then, only make highest level 301 available for net that still fail at layer 303. View 403 shows a typical prior art result, while view 405 shows that titration in accordance with one or more embodiments is expected to be better in at least some instances.

Figure 5:
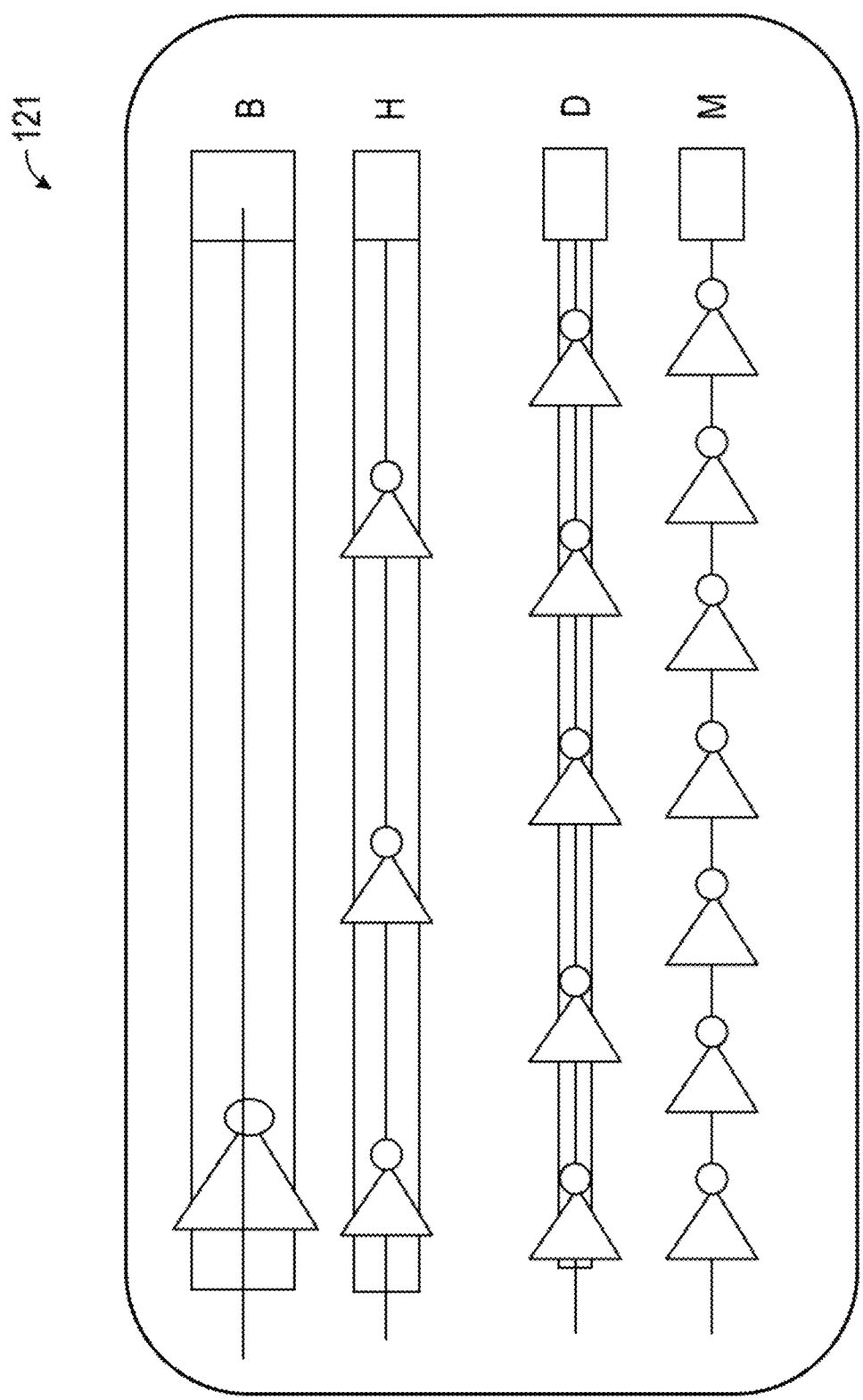
FIG. 5 shows congestion-aware rebuffering, in accordance with an exemplary embodiment.

Referring to FIG. 5, consider congestion aware rebuffering 121, according to an aspect of the invention. In the example, there are layers B, H, D, and M going from widest/highest to narrowest/lowest. In this aspect, carry out layer assignment and buffering together—if more layers are available, balance/reduce the number of buffers needed. Buffering is redone, for example, because after aggressive layer demotion, upper layer resources are available; because pure layer assignment could result in overusing buffers (more buffers than needed); and/or because rebuffering with layer assignment can potentially close timing with fewer buffers. In the example of FIG. 5, 7 buffers are needed in layer M, 5 in layer D, 3 in layer H, and only one is needed with the net located in layer B.

Figure 6:
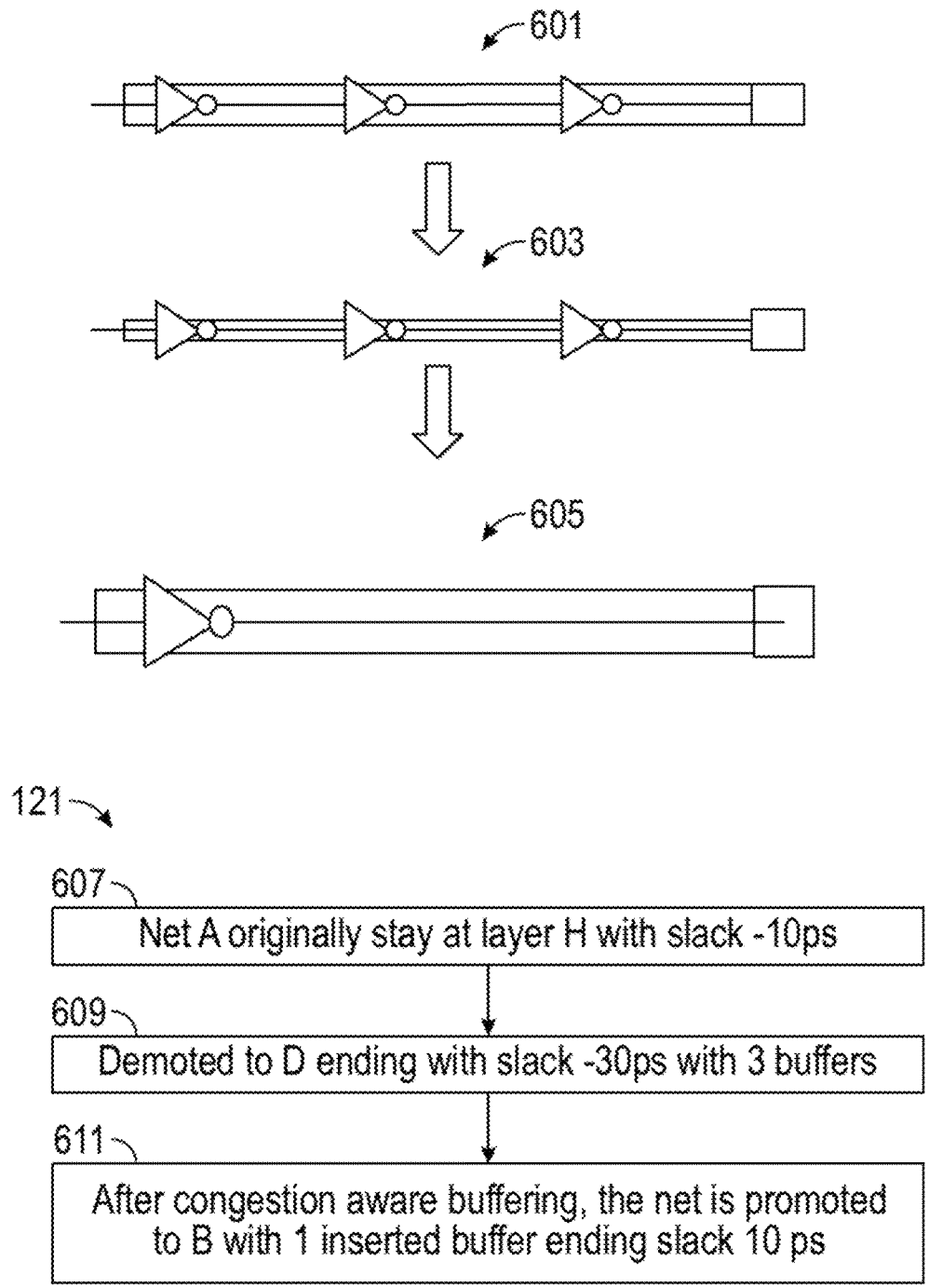
FIG. 6 shows aspects of rebuffering, in accordance with an exemplary embodiment.

FIG. 6 shows an example of congestion-aware rebuffering 121. At 601 step 607, net A originally stay at layer H with slack −10 ps. It is demoted to layer D at 603 step 609, ending with slack −30 ps with 3 buffers. After congestion-aware buffering, the net is promoted to layer B at 605 step 611 with a single inserted buffer and an ending slack of 10 ps (all slack values herein are expressed in ps/picoseconds unless otherwise noted).

Regarding final tuning step 127, in a non-limiting example, the same repeats step 117 and can also include conventional tuning techniques as desired; in essence, step 127 can be thought of as one more iteration to try to improve QOR.

Figure 7:
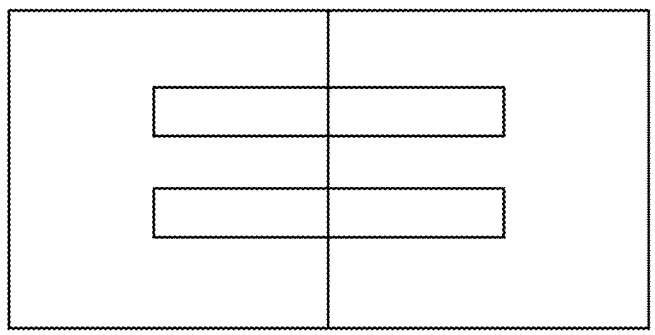
FIGS. 7 and 8 shows layer swapping, in accordance with an exemplary embodiment.
Figure 7:
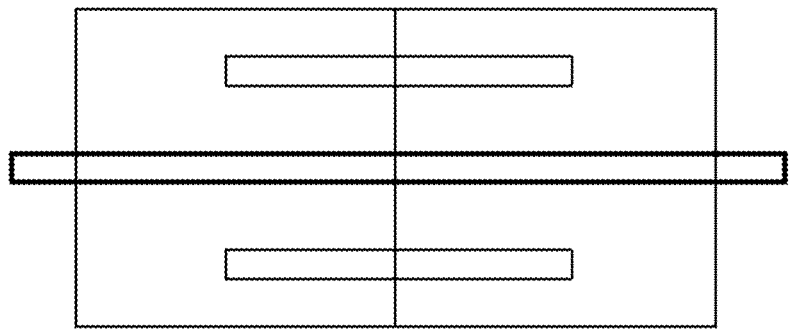
Figure 8:
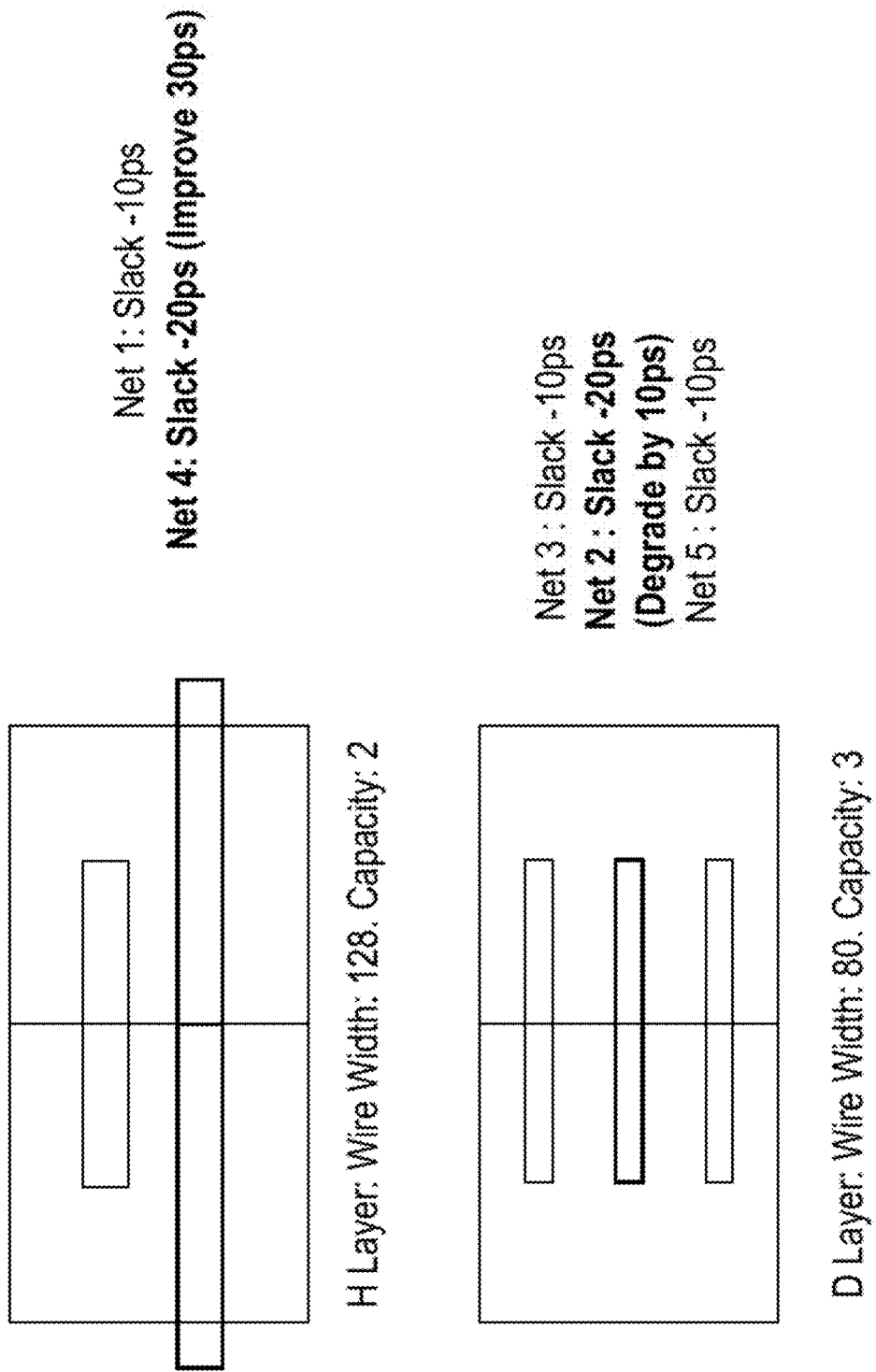

Now consider a layer swap based on "rough" or "approximate" routing (FIGS. 7 and 8). A non-limiting example of such a router is Michael D. Moffitt, MAIZEROUTER: Engineering an Effective Global Router, IEEE Transactions on Computer-Aided Design of Integrated Circuits and Systems, 2008 Oct. 21; 27(11):2017-26. See also co-assigned U.S. Pat. No. 10,831,971, Quay; Stephen Thomas et al., Net layer promotion with swap capability in electronic design. For a timing-critical net (target net), promote the same to a higher layer if the space is available. However, if there is no space, find other nets on the target layer (candidate nets) which satisfy certain given conditions, and demote one or more candidate nets to lower layers so that the target net can be promoted. Examples of candidate net selection criteria include: significantly less timing critical compared to the target net; competing with the target net for the same routing resources; and/or the timing gain for the target net from the swap is greater than the timing loss from the swap.

In FIG. 7, consider competition for routing resources among different nets. In a non-limiting example, Net 4 has a slack of −50 ps; it would be better if it could be promoted from D to H. However, there is no space. Layer D has a wire width of 80 and a capacity of 3; there are three nets on Layer D: Net 3 with slack −10 ps; Net 4 with slack −50 ps, and Net 5 with slack −10 ps. Net 4 thus has a bad negative slack but is "stuck" on Layer D. Layer H has a wire width of 128 and a capacity of 2; there are two nets on Layer H: Net 1 with slack −10 ps and Net 2, also with slack −10 ps.

Now continuing with the example from FIG. 7 in FIG. 8, promote net 4 to H, while demoting net 2 to D. Net 1 still has slack −10 ps while promoted Net 4 now has slack −20 ps, an improvement of 30 ps. Net 3 and Net 5 have the same slack as before. Demoted Net 2 now has slack −20 ps, a degradation of 10 ps. The total gain is 30−10=20 ps, with overflow=0 (i.e., there is no overflow—overflow refers to a condition where there are no more available routing resources available and the available space has been overflowed).

Figure 9:
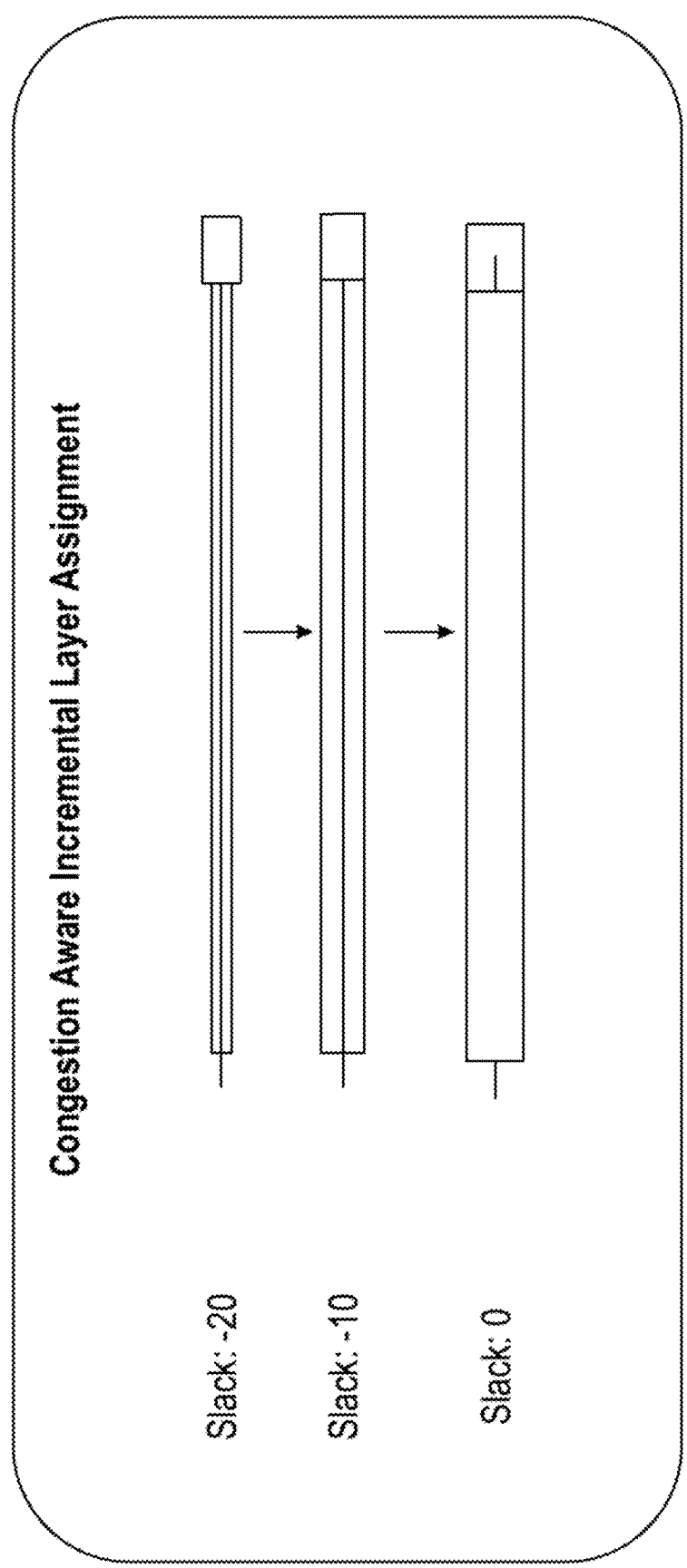
FIG. 9 shows congestion-aware incremental layer assignment, in accordance with an exemplary embodiment.

Referring to FIG. 9, consider congestion-aware incremental layer assignment. This creates the opportunity to carry out more efficient layer assignment in timing-critical regions, via a gradually controlled layer assignment, ensuring that the long net/wire delay-dominated nets can be assigned to the wider wires. In this regard, once a significant number of wires have been demoted, carefully redo the layer assignment. For example, determine whether there are long nets that need to use an upper layer wire, or nets dominated by wire delays. Lower layers typically should not be used for long wires—long wires will likely need to use higher-level wiring. However, there might be some long wires forced at least partially to a lower layer because the upper layer is not available over the whole path. This can be addressed at this stage by re-doing layer assignment gradually in a congestion-aware manner, which helps recover timing and/or ensures that nets that really need upper-level resources get them. In the example, When the net is at the lowest layer, the slack is −20; this improves to −10 at the middle layer and 0 at the top layer.

Figure 10:
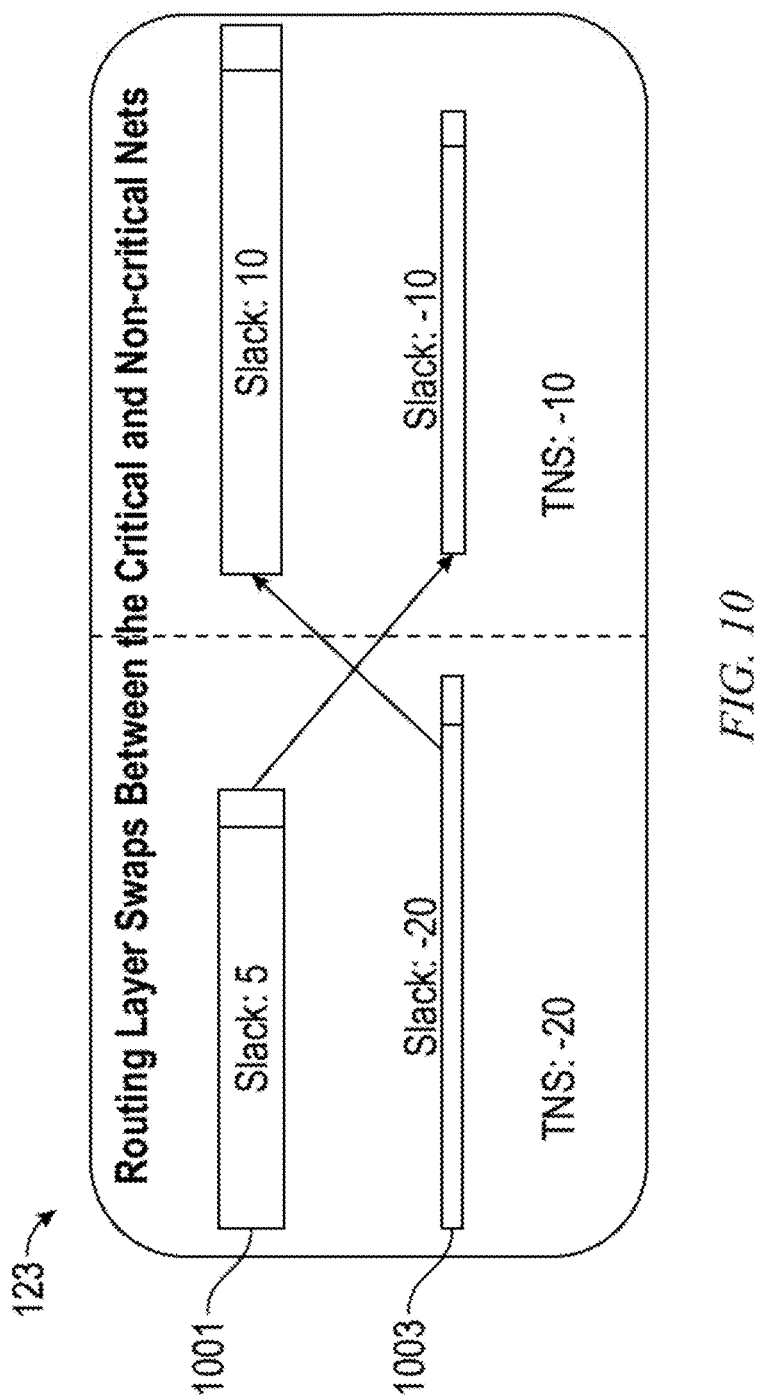
FIG. 10 shows routing layer swaps between critical and non-critical nets, in accordance with an exemplary embodiment.

FIG. 10 shows an example of layer swap 123, wherein opportunities are sought to swap wires/routes between nets to obtain overall timing improvements, advantageously shifting resources away from less critical or non-critical regions to more critical regions. For example, once demotion has been carried out, look for swap opportunities. In the example of FIG. 10, the worst slack goes from −20 to −10. The upper left-hand net 1001 worsened when demoted but the lower left-hand net 1003 improved significantly when promoted. The lower left-hand net 1003 with slack −20 is "stuck" on a lower layer because an upper layer wire is not available in that region. The upper left-hand net 1001 is demoted so the lower left-hand net can be moved up to a thicker layer at slack +10. The total negative slack (TNS) improves from −20 to −10 in the example; the goal in one or more embodiments is to get to zero.

Referring again to FIG. 6, consider gradually controlled layer assignment and buffering. Layer resources are released gradually to limit usage, in an incremental and congestion-aware manner. As seen at 601, there is originally a wire of medium thickness, at layer H, with three buffers and slack −10 ps. It is demoted to a lower layer D at 603, still with three buffers, with a slack now −30 ps. However, there is an option available to use wider wire at level B which can reduce the number of buffers to one and improve timing to an ending slack of +10 ps, as at 605. Thus, in terms of handling long wires, layer assignment and buffering can both be used. There are limits to how far a path can go without buffering, even for wide wires. Thus, for this reason, buffering is sometimes needed, as well as because of fan-out. The buffer refreshes the signal. Lower layer wires typically need more buffers than do wider upper-layer wires.

Thus, one or more embodiments are employed near the end of the phy syn process, because otherwise, routing layer assignments may be inefficient due to various reasons, which may lead to sub-optimal QOR and/or routing congestion. One or more embodiments accordingly provide an optimization flow to re-leverage the routing resources to improve timing QOR and/or reduce routing congestion. One or more embodiments start with aggressive layer demotion in congested regions, followed by various low-cost non-layer-assignment optimizations. Next, gradual/incremental congestion-aware layer assignments and/or buffering techniques are used to improve the timing/congestion.

Experimental Results

Based on our preliminary experimental results, one or more embodiments provide congestion reduction along with some timing benefits. For a non-congestion-challenged designs, we have found that 90% of the designs have timing improvement with either similar congestion or ~1% improvement in congestion. In one non-limiting experimental example, techniques in accordance with an embodiment of the invention were employed on a congestion-challenged design with approximately two million gates, efficiently reducing 5% congestion to make the design routable. In our experiments, we used the congestion metric from Wei Y, Sze C, Viswanathan N, Li Z, Alpert C J, Reddy L, Huber A D, Tellez G E, Keller D, and Sapatnekar S S, GLARE: Global and local wiring aware routability evaluation, in DAC Design Automation Conference 2012, 2012 Jun. 3 (pp. 768-773), IEEE; refer also to the above-mentioned US Patent Application Publication 2013-0086545A1. One or more embodiments thus advantageously clear up congestion to make congested designs routable. Note that highly congested designs may not be feasible/routable so that the theoretical timing they provide may not be realizable in practice. Furthermore, for non-congestion challenged designs, one or more embodiments can improve the timing while keeping similar congestion.

Thus, one or more embodiments provide routing layer re-optimization. One or more embodiments use a fast PDS (physical design synthesis) incremental router such as a "rough" or "approximate" router discussed above (e.g., Michael D. Moffitt, MAIZEROUTER: Engineering an Effective Global Router), with a commercially available "Golden" router such as in Gester, Michael, et al. "Algorithms and Data Structures for Fast and Good VLSI Routing," In DAC Design Automation Conference 2012, 2012 Jun. 3 (pp. 459-464), IEEE. In this context, "Golden" refers to an accurate gold standard. We have found that timing QOR recovery and congestion mitigation may depend on, for example, accurate feedback from the "rough" or "approximate" router, and good correlation between the "rough" or "approximate" router and the "Golden" router.

Thus, the skilled artisan will appreciate that heretofore, in physical synthesis, it has been difficult to get layer assignment right in "one shot" without revisiting. One or more embodiments advantageously provide for performing routing layer re-optimization and a decongestion process during later stages of physical synthesis timing closure, which: identify routing hot spot (high-congestion) areas in the design and collect all the nets traversing through such areas; and/or demote such set of nets in bulk/en masse to reduce congestion; wherein subsequent processing promotes nets and/or performs general timing optimization as needed to recover/improve timing QOR without significantly impacting congestion. One or more embodiments carry out bulk demotion even in the presence of timing issues.

Furthermore, one or more embodiments provide techniques for limiting the collateral damage to timing QOR from the aforementioned bulk layer demotion process and to rapidly recover timing QOR, wherein the bulk demotion process is subjected to the following constraints: not introducing any new or worsening existing electrical violations; and not introducing any new net timing slacks below the following limit:

slack_scale_factor*worst-latch_to_latch-slack-in-design-prior-to-demotion-process where: slack_scale_factor typical value is about 0.8 but can range, for example, from 0.0 to 1.0. Furthermore regarding selection of this value, in one or more embodiments, the closer to 1.0, the more risk is tolerated—thus, timing may be degraded more. Conversely, the closer to zero, the safer (less chance of degrading timing). In one or more embodiments, compute the worst latch-to-latch slack in the design. Keep demoting nets as long as the slack does not decrease below the scaled value. If scaling is by zero, there is no decrease in slack (safest as fewer nest will be demoted and timing will be degraded less often). If scaling is by 1.0, a big decrease in slack will be tolerated and thus the approach is more aggressive. Given the teachings herein, the skilled artisan can develop an empirical/heuristic approach based on experience regarding how much risk to take—0.8 is a non-limiting example and can serve as a useful starting point when developing heuristics.

For example, if the worst latch-to-latch slack prior to applying techniques of the present invention is −50, take 0.8*-50 and do not demote any net if its slack gets worse than −40.

Furthermore in this regard, let nslk_o and nslk_d be, respectively, the slacks of a net n before and after demotion. Let wslk_l2l be the worst slack over all latch-to-latch paths in the design. The constant "t-fuzz" is a technology dependent constant with a typical value of 0.1 ps. Furthermore regarding selecting t-fuzz, when floating point numbers are compared, there is typically some noise in how the computer represents same. In one or more embodiments, the parameter "t-fuzz" is empirically picked to account for this, and can be thought of as a "weak" significant digit that will be above any floating point inaccuracy when performing a floating point calculation. Given the teachings herein, the skilled artisan can pick a value for "t-fuzz" based on the computer the EDA is being run on, whether the calculations are using single or double precision variables, and the technology of the circuit being analyzed, as well as the order of magnitude of what is being compared. Here, quantities measure in ps are being compared so roughly "t-fuzz" is selected as 10% of the interesting/base unit (1 ps)=0.1 ps. The parameter "t-fuzz" helps ensure that one number is significantly different than another (beyond FLOP errors). The slack_scale_factor discussed above is in the range [0.0, 1.0]; as noted, a typical value is 0.8. Then determine wslk_l2l_scaled=(slack_scale_factor*wslk_l2l) and skip demoting any net which satisfies the following condition:

(((nslk_o-nslk_d)>t-fuzz) and
(nslk_d<wslk_l2l_scaled)).

In this aspect, analyze a portion of a design—this portion has a boundary where it interacts with the outside world/other portions of the design. There are inputs and outputs to the portion. Regarding clock slack—think of two registers/latches completely contained in the portion, and a path between them. Follow the path from one register/latch (memory element) to another register/latch (memory element). The output from one latch holds a value/signal, the process starts, and the signal passes through a number of gates and has to reach the second register/latch in a specified amount of time. If both the latches and the path are completely contained in the portion, this is referred to as a latch-to-latch or register-to-register path or internal slack/internal path. There is typically more control over optimization/timing closure for an internal path. Compare this to a case where the sink latch is in the portion but the source latch is outside the portion. Suppose 30% of the time the signal spends in travelling is outside the portion. This is called a boundary path. There is typically less control in this case. It should be noted that in general, a secondary metric in addition to worst (internal) slack can be used to control demotion, in some instances—this metric can be, for example, power, latch-to-latch slack, area, priority path slack/timing, and the like—indeed, any other suitable metric beyond worst slack that can be used to control demotion.

In a further aspect, techniques are provided for reducing the need for upper routing layer resources during routing layer re-optimization and decongestion as discussed above. In one or more embodiments, such techniques employ low-cost/cheap optimization techniques (that do not use layers) to improve timing QOR, including but not limited to the following: identifying gates with critical slacks connected to demoted nets, with sub-optimal locations, and moving them to optimal locations; and/or identifying gates with critical slacks connected to demoted nets with sub-optimal sizes and changing them to optimal sizes.

In a still further aspect, techniques are provided for reducing the need for upper routing layer resources during routing layer re-optimization and decongestion as discussed above, employing a layer-titration process (releasing resources gradually) while performing layer-assignment on demoted nets, including: release only one layer-trait at a time for use, starting with the lowest trait; after all nets are processed, release the next higher layer trait and repeat; iterate until all layer traits are released.

In yet a further aspect, consider the "influence-metric," which is a known method to measure the cone of influence of a net as a function of backward/forward cones. That is to say, how many other critical nets will a net influence? One or more embodiments advantageously provide techniques to leverage this known metric by using it to limit the collateral damage to timing QOR from embodiments of the inventive bulk layer demotion process and to recover timing QOR faster. In this aspect, subject the bulk demotion process to the following constraints: compute influence-metric for all candidate nets; and skip any critical nets with influence-metric>influence_threshold. Typical influence_threshold values are computed empirically, in a manner similar to that described above for slack_scale_factor. The higher the influence threshold, the more nets are demoted and the more risk is taken as to timing but also the more potential reward. Regarding the influence metric, this can be taken as the number of timing endpoints a particular net reaches or influences (trace the net forward and backward and see how many timing endpoints it reaches—that is the influence metric). For a starting point, if a net impacts more than some value selected from 3-10 timing endpoints (e.g., 5), skip that net (do not demote). In a non-limiting example, start with, e.g., a value of 5 and see if it works well; more conservative or more aggressive values can be selected as needed. Thus, demote nets with low influence over nets with high influence.

It will be appreciated that in addition to routing congestion mitigation, aspects of the invention are generally applicable to precious resources in an IC design or the like. Assume a physical synthesis process targeting a primary metric (e.g., timing) and a secondary metric that measures a precious resource utilization (e.g., power/area or upper layers). Perform physical synthesis until the primary metric is reasonable. The secondary metric is targeted on and off. Use the primary metric value achieved as a recovery target: p-target. Now, aggressively optimize the secondary metric (power-down, layer-demotion, and the like), even at the expense of the primary metric. Reduce the need for the underlying precious resource using cheaper alternatives; e.g., reduce the power/area needed by using box-movement, pin-swapping, or the like to improve the primary metric: timing. In a gradual and controlled fashion, use the precious resource to improve the primary metric; e.g., more area/upper layers to improve timing. Stop if the primary metric is close top-target or within some tolerance level (e.g., 5%). Optionally, as a last resort, use the precious resource aggressively to recover the primary metric, if necessary.

One or more embodiments thus provide techniques for re-routing a design wiring including identifying areas in the design with high congestion and determining all the nets traversing through such areas; demote all of the determined nets; and promoting individual nets of the demoted nets based on a timing constraint.

It is worth noting that one or more prior art approaches process only one net at a time, do not carry out bulk demotion, do not use any cheaper optimizations to reduce upper layer usage, and typically demote/promote segments or parts of a net only. One or more embodiments demote/promote entire nets. Furthermore, one or more prior art approaches address via minimization during the global routing process as opposed to direct timing QOR optimization according to one or more embodiments.

One or more embodiments optimize routing layer usage to mitigate congestion and/or improve timing quality of results. Indeed, one or more embodiments seek to rectify routing congestion and/or timing QOR issues arising from the (earlier) primary layer assignment process by selectively revisiting the assignments made during the primary layer assignment process along with other techniques to improve timing QOR and/or reduce congestion.

Given the discussion thus far, it will be appreciated that an exemplary method for increasing the efficiency of electronic design automation, according to an aspect of the invention, includes, at an end point of physical design synthesis optimization flow (e.g., within a timing closure step 3109 of an electronic design automation process and optionally within a fine optimization process 113 thereof) for a putative integrated circuit design having a plurality of nets, identifying (step 203) at least one congested region 201 in the putative integrated circuit design. The method further includes identifying those of the nets of the putative integrated circuit design traversing through the at least one congested region, to obtain a plurality of candidate nets for demotion. The method still further includes (step 205) demoting a plurality of selected nets, selected from the plurality of candidate nets for demotion, from an upper routing layer of the putative integrated circuit design to a lower routing layer of the putative integrated circuit design, wherein at least some of the plurality of selected nets experience a loss (acceptable) of timing quality of result after the demoting. Typically, while there is some loss of timing for individual nets based on demotion, overall timing quality of result is enhanced and/or congestion is kept under control.

Regarding the step of identifying at least one congested region, a "rough" or "approximate" routing program can be used to help estimate congestion. For example, divide the design into a series of tiles/grid pattern, in a manner that in itself is known to the skilled artisan, and then compute a congestion metric for each tile (see discussion of Wei Y, et al., GLARE: Global and local wiring aware routability evaluation, as well as above-mentioned US Patent Application Publication 2013-0086545A1). Examine each tile and determine whether resources in that tile are being used above a certain threshold (for example, 92-93%, but other embodiments/applications could have a different value, as discussed herein). A tile can be deemed to be congested if usage in that tile crosses the certain threshold.

Regarding the step of identifying those of the nets of the putative integrated circuit design traversing through the at least one congested region, various EDA programs have utilities that help to find nets in a certain congested region; a net that passes through one or more congested tiles can be defined as a congested net.

Regarding the step of demoting the plurality of selected nets, the demotion per se can be carried out by specifying within the design language that a given net is being demoted. In one or more embodiments, new computer code can be written to carry out the bulk demotion, selecting which nets to demote subject to various criteria discussed herein. Demotion can be, but need not necessarily be, from the topmost layer to the lowest layer. In general, demotion is relative, going from a higher to a lower layer.

In one or more embodiments, starting from a current layer, check timing slack, and demote one layer down at a time, and then check revised slack versus various criteria as discussed. One or more embodiments demote en masse even if there is a loss of timing QOR, late in the timing closure phase. In theory, all of the plurality of candidate nets for demotion could be demoted, but this may be unnecessary and/or doing so may increase the time needed to recover timing QOR and/or doing so may hurt the timing QOR. Thus, one or more embodiments demote en masse but not necessarily all nets in the congested region(s). One or more embodiments demote a large percentage (e.g., at least 50%) of the nets in the congested region, even if timing degrades, subject to various checks as discussed herein (which improves timing recovery). More generally, this percentage can be at least 30%, at least 40%, at least 50%, at least 60%, at least 70%, at least 80%, or at least 90%.

One or more embodiments further include limiting negative impact to timing closure of the putative integrated circuit design by selecting the plurality of selected nets from the plurality of candidate nets for demotion, by refraining from demotion based on constraints of: not introducing any new electrical violations to the putative integrated circuit design during the demoting; not worsening any existing electrical violations in the putative integrated circuit design during the demoting; and not introducing any new net timing slacks below a predetermined limit to the putative integrated circuit design during the demoting. For example, the step of not introducing any new net timing slacks below the predetermined limit can include not demoting a given one of the plurality of candidate nets for demotion responsive to determining that: a timing slack of the given one of the candidate nets for demotion before demotion less a timing slack of the given one of the candidate nets for demotion after demotion would exceed a predetermined technology-dependent constant; and the timing slack of the given one of the candidate nets for demotion after demotion would be less than a scaled worst overall latch-to-latch slack. See discussion of wslk_l2l_scaled elsewhere herein; the same is based on the pre-demotion design in one or more embodiments. As noted, in general, a secondary metric in addition to worst (internal) slack can be used to control demotion, in some instances—this metric can be, for example, power, latch-to-latch slack, area, priority path slack/timing, and the like—indeed, any other suitable metric beyond worst slack can be used to control demotion in some cases.

One or more embodiments further include identifying at least one gate, with a critical slack, that is connected to the at least one demoted net demoted in the step of demoting the plurality of selected nets, and moving the at least one gate from a suboptimal location to an optimal location and/or changing the at least one gate from a suboptimal size to an optimal size. These steps can be independent or can be done in connection with other techniques disclosed. See discussion of FIG. 3 for example. Pin swapping can also be carried out in some instances. More generally, moving a gate to an optimal location and/or changing the gate size to an optimal size are two non-limiting examples but other optimizations could also be employed. In general, compared to using higher layers, optimizations such as moving a gate to an optimal location (or changing the gate to optimal size), within reason, are cheaper. If they improve QOR significantly, then it is possible to save on using higher layers which are more precious, and such saved layers can be used to improve other, more intractable nets.

One or more embodiments further include, subsequent to the demoting step, selectively promoting selected individual demoted nets demoted in the step of demoting the plurality of selected nets, as needed to close timing, while making only one next-highest wiring level available at a time. Refer to the discussion of layer titration (FIG. 4). This step can be independent or can be done in connection with other techniques disclosed.

One or more embodiments further include limiting negative impact to timing closure of the putative integrated circuit design by selecting the plurality of selected nets from the plurality of candidate nets for demotion, by refraining from demotion based on a constraint of not demoting when an influence metric of a given one of the candidate nets for demotion exceeds a predetermined influence threshold. Refer to the discussion of influence metric. This step can be independent or can be done in connection with other techniques disclosed.

One or more embodiments further include making at least one design change to the putative circuit design based on the demoting of the plurality of selected nets.

One or more embodiments include updating the putative circuit design to reflect the at least one design change; and fabricating a physical integrated circuit in accordance with the updated circuit design.

Figure 12:
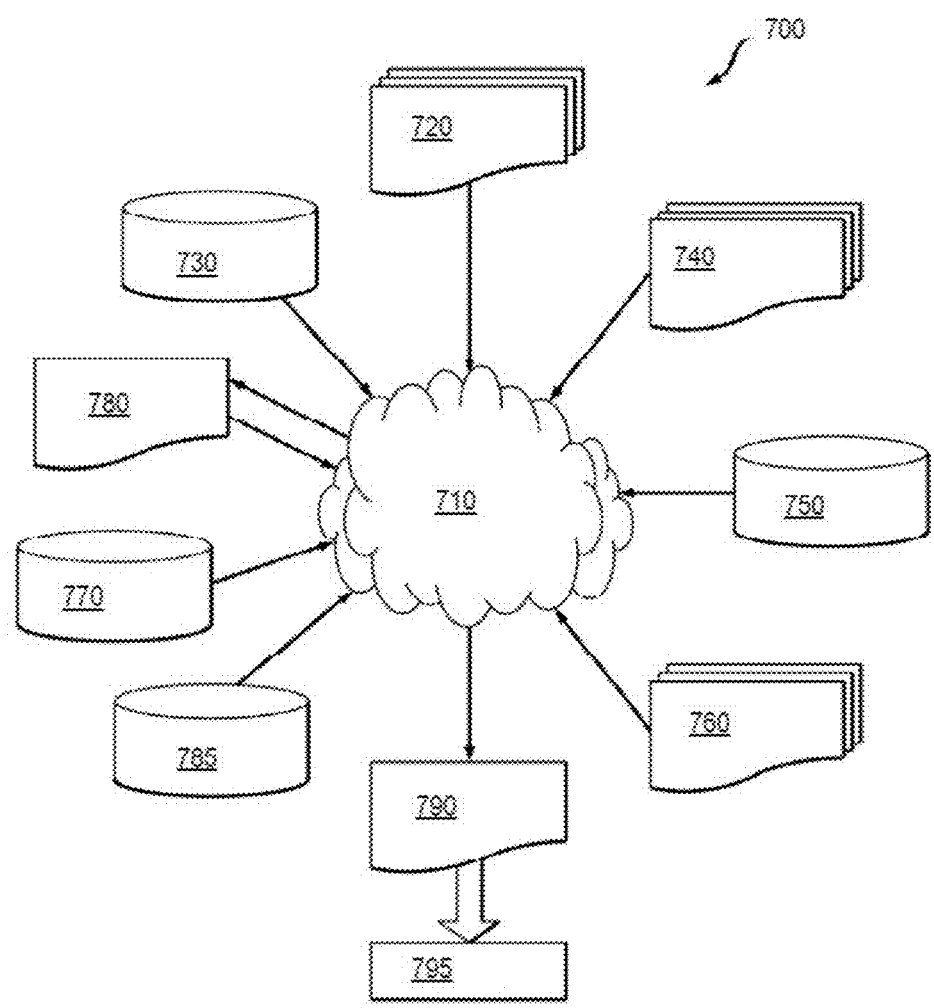
FIG. 12 is a flow diagram of a design process used in semiconductor design, manufacture, and/or test.
Figure 13:
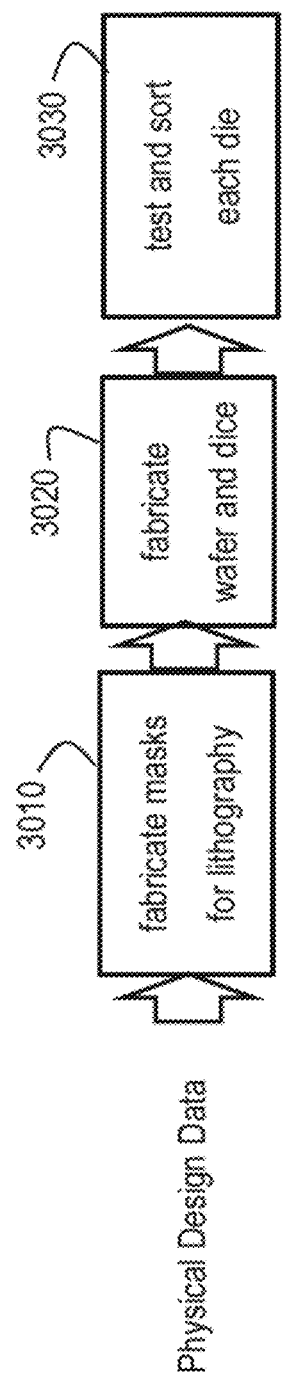
FIG. 13 shows further aspects of IC fabrication from physical design data.
Figure 14:
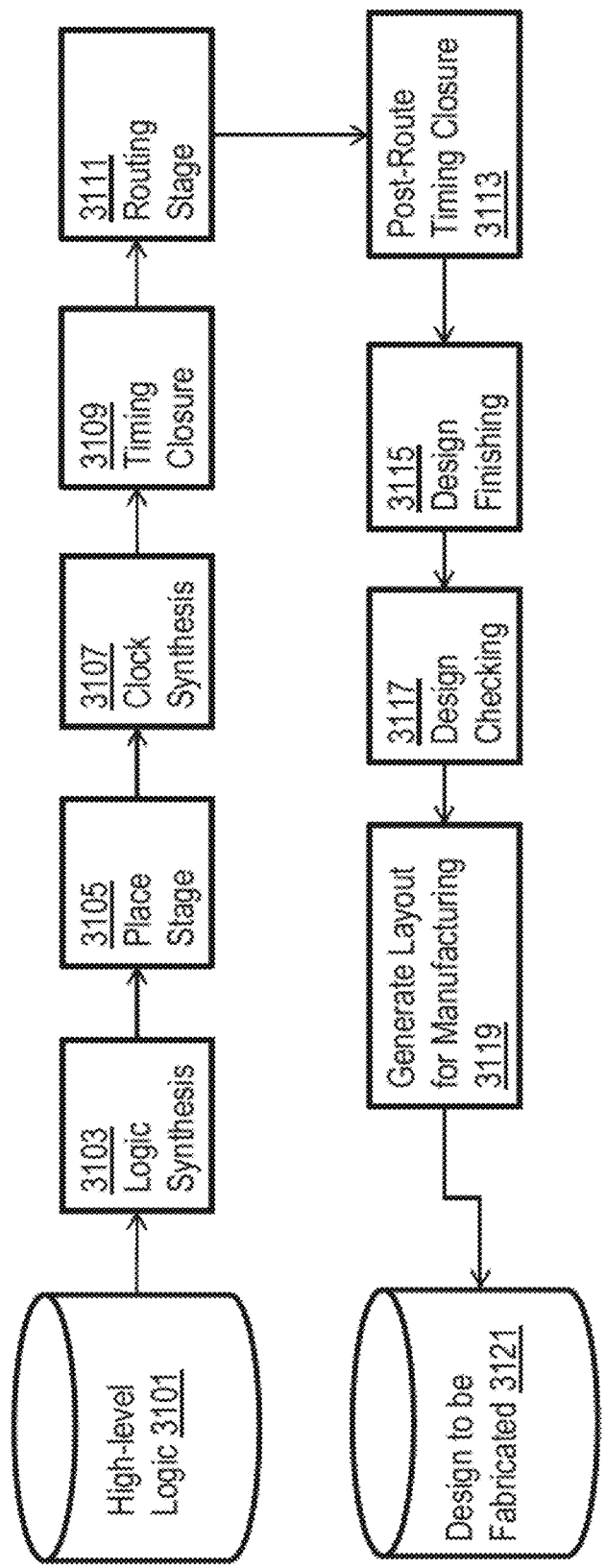
FIG. 14 shows an exemplary high-level Electronic Design Automation (EDA) tool flow, within which aspects of the invention can be employed.

For example, referring to FIGS. 12-14 discussed elsewhere herein, render the updated circuit design in a design language; and prepare a layout based on the updated circuit design rendered in the design language. Instantiate the layout as a design structure. The physical integrated circuit is then fabricated in accordance with the design structure.

Accordingly, in one or more embodiments, the layout is instantiated as a design structure. See discussion of FIG. 12. A physical integrated circuit is then fabricated in accordance with the design structure. See again discussion of FIG. 12. Refer also to FIG. 13. Once the physical design data is obtained, based, in part, on the analytical processes described herein, an integrated circuit designed in accordance therewith can be fabricated according to known processes that are generally described with reference to FIG. 13. Generally, a wafer with multiple copies of the final design is fabricated and cut (i.e., diced) such that each die is one copy of the integrated circuit. At block 3010, the processes include fabricating masks for lithography based on the finalized physical layout. At block 3020, fabricating the wafer includes using the masks to perform photolithography and etching. Once the wafer is diced, testing and sorting each die is performed at 3030 to filter out any faulty die.

One or more embodiments include a computer program product (e.g., a non-transitory computer readable medium) for increasing the efficiency of electronic design automation; the computer program product includes one or more computer readable storage media, and program instructions collectively stored on the one or more computer readable storage media, the program instructions including program instructions to carry out any one, some, or all of the method steps disclosed herein.

Figure 11:
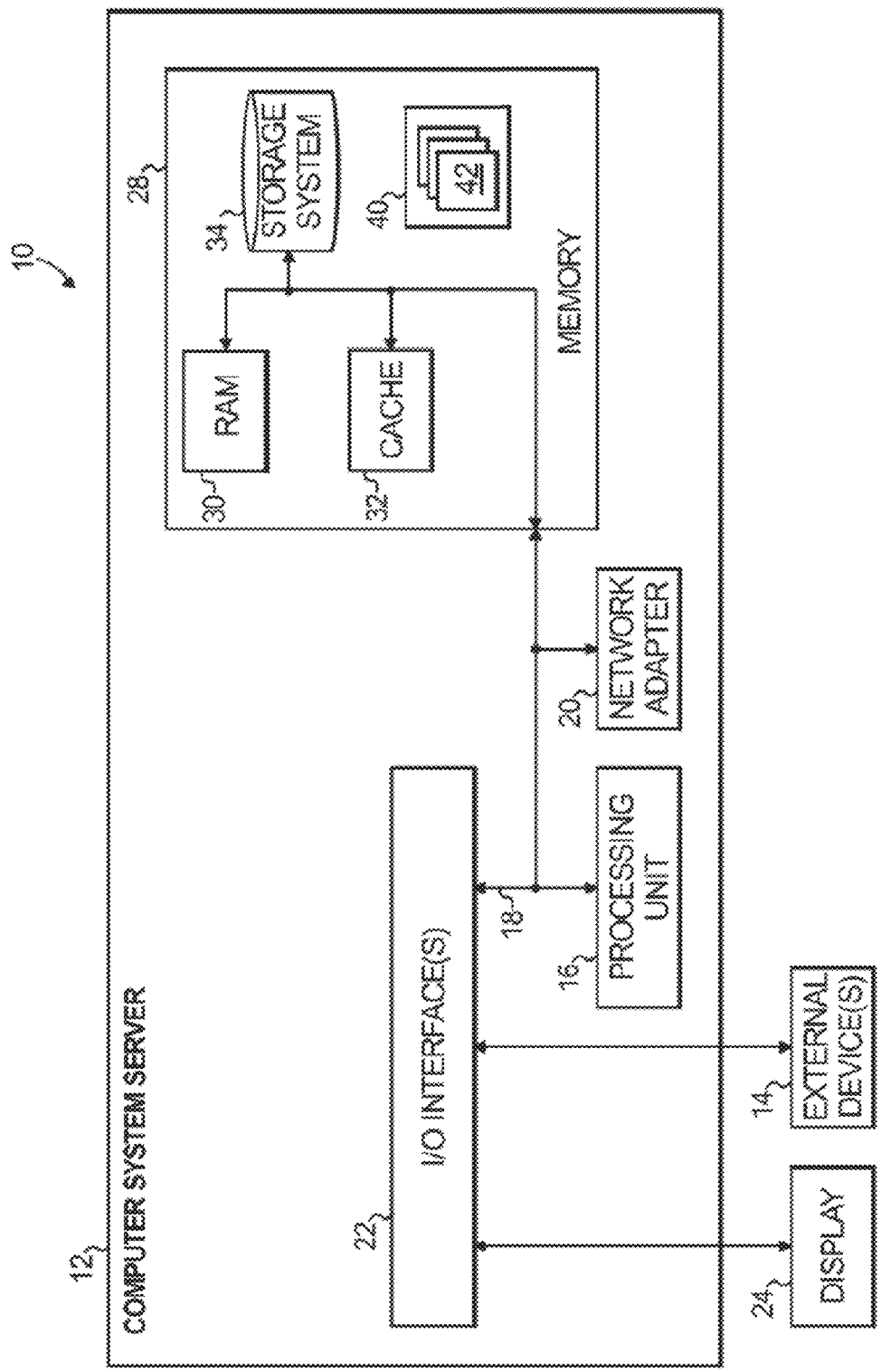
FIG. 11 depicts a computer system that may be useful in implementing one or more aspects and/or elements of the invention.

One or more embodiments include a computer including a memory 28; and at least one processor 16, coupled to the memory, and operative to carry out or otherwise facilitate any one, some, or all of the method steps described herein (as depicted in FIG. 11). In one or more embodiments, the performance (speed) of this computer (which is performing EDA) is improved, for example, by reducing runtime and/or memory requirements (otherwise congested designs require undesirable iterations, re-running of tools with alternative settings, and the like; furthermore, for non-congested designs, one or more embodiments require less work for timing closure than prior art techniques). Optionally, a computer-readable storage medium includes instruction that configure the processor when loaded into the memory; the instructions can, for example, cause instantiation of components such as a "rough" router, component that determines a congestion metric, and the like, as discussed herein.

Furthermore, referring to FIG. 12, in one or more embodiments the at least one processor is operative to generate a design structure for the circuit design in accordance with the analysis, and in at least some embodiments, the at least one processor is further operative to control integrated circuit manufacturing equipment to fabricate a physical integrated circuit in accordance with the design structure. Thus, the layout can be instantiated as a design structure, and the design structure can be provided to fabrication equipment to facilitate fabrication of a physical integrated circuit in accordance with the design structure. The physical integrated circuit will be improved (for example, because of enhancing timing quality of result and/or keeping congestion under control.)

FIG. 14 depicts an example high-level Electronic Design Automation (EDA) tool flow, which is responsible for creating an optimized microprocessor (or other IC) design to be manufactured. A designer could start with a high-level logic description 3101 of the circuit (e.g. VHDL or Verilog). The logic synthesis tool 3103 compiles the logic, and optimizes it without any sense of its physical representation, and with estimated timing information. The placement tool 3105 takes the logical description and places each component, looking to minimize congestion in each area of the design. The clock synthesis tool 3107 optimizes the clock tree network by cloning/balancing/buffering the latches or registers. The timing closure step 3109 performs a number of optimizations on the design, including buffering, wire tuning, and circuit repowering; its goal is to produce a design which is routable, without timing violations, and without excess power consumption. The routing stage 3111 takes the placed/optimized design, and determines how to create wires to connect all of the components, without causing manufacturing violations. Post-route timing closure 3113 performs another set of optimizations to resolve any violations that are remaining after the routing. Design finishing 3115 then adds extra metal shapes to the netlist, to conform with manufacturing requirements. The checking steps 3117 analyze whether the design is violating any requirements such as manufacturing, timing, power, electromigration (e.g., using techniques disclosed herein) or noise. When the design is clean, the final step 3119 is to generate a layout for the design, representing all the shapes to be fabricated in the design to be fabricated 3121.

One or more embodiments of the invention, or elements thereof, can be implemented in the form of an apparatus including a memory and at least one processor that is coupled to the memory and operative to perform exemplary method steps. FIG. 11 depicts a computer system that may be useful in implementing one or more aspects and/or elements of the invention; it is referred to herein as a cloud computing node but is also representative of a server, general purpose-computer, etc. which may be provided in a cloud or locally.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 11 such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 11) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Exemplary Design Process Used in Semiconductor Design, Manufacture, and/or Test

One or more embodiments integrate the characterizing and simulating techniques herein with semiconductor integrated circuit design simulation, test, layout, and/or manufacture. In this regard, FIG. 12 shows a block diagram of an exemplary design flow 700 used for example, in semiconductor IC logic design, simulation, test, layout, and manufacture. Design flow 700 includes processes, machines and/or mechanisms for processing design structures or devices to generate logically or otherwise functionally equivalent representations of design structures and/or devices, such as those that can be analyzed using techniques disclosed herein or the like. The design structures processed and/or generated by design flow 700 may be encoded on machine-readable storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 700 may vary depending on the type of representation being designed. For example, a design flow 700 for building an application specific IC (ASIC) may differ from a design flow 700 for designing a standard component or from a design flow 700 for instantiating the design into a programmable array, for example a programmable gate array (PGA) or a field programmable gate array (FPGA) offered by Altera® Inc. or Xilinx® Inc.

FIG. 12 illustrates multiple such design structures including an input design structure 720 that is preferably processed by a design process 710. Design structure 720 may be a logical simulation design structure generated and processed by design process 710 to produce a logically equivalent functional representation of a hardware device. Design structure 720 may also or alternatively comprise data and/or program instructions that when processed by design process 710, generate a functional representation of the physical structure of a hardware device. Whether representing functional and/or structural design features, design structure 720 may be generated using electronic computer-aided design (ECAD) such as implemented by a core developer/designer. When encoded on a gate array or storage medium or the like, design structure 720 may be accessed and processed by one or more hardware and/or software modules within design process 710 to simulate or otherwise functionally represent an electronic component, circuit, electronic or logic module, apparatus, device, or system. As such, design structure 720 may comprise files or other data structures including human and/or machine-readable source code, compiled structures, and computer executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 710 preferably employs and incorporates hardware and/or software modules for synthesizing, translating, or otherwise processing a design/simulation functional equivalent of components, circuits, devices, or logic structures to generate a Netlist 780 which may contain design structures such as design structure 720. Netlist 780 may comprise, for example, compiled or otherwise processed data structures representing a list of wires, discrete components, logic gates, control circuits, I/O devices, models, etc. that describes the connections to other elements and circuits in an integrated circuit design. Netlist 780 may be synthesized using an iterative process in which netlist 780 is resynthesized one or more times depending on design specifications and parameters for the device. As with other design structure types described herein, netlist 780 may be recorded on a machine-readable data storage medium or programmed into a programmable gate array. The medium may be a nonvolatile storage medium such as a magnetic or optical disk drive, a programmable gate array, a compact flash, or other flash memory. Additionally, or in the alternative, the medium may be a system or cache memory, buffer space, or other suitable memory.

Design process 710 may include hardware and software modules for processing a variety of input data structure types including Netlist 780. Such data structure types may reside, for example, within library elements 730 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 740, characterization data 750, verification data 760, design rules 770, and test data files 785 which may include input test patterns, output test results, and other testing information. Design process 710 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 710 without deviating from the scope and spirit of the invention. Design process 710 may also include modules for performing standard circuit design processes such as timing analysis, verification, design rule checking, place and route operations, etc. Improved latch tree synthesis can be performed as described herein.

Design process 710 employs and incorporates logic and physical design tools such as HDL compilers and simulation model build tools to process design structure 720 together with some or all of the depicted supporting data structures along with any additional mechanical design or data (if applicable), to generate a second design structure 790. Design structure 790 resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures). Similar to design structure 720, design structure 790 preferably comprises one or more files, data structures, or other computer-encoded data or instructions that reside on data storage media and that when processed by an ECAD system generate a logically or otherwise functionally equivalent form of one or more IC designs or the like. In one embodiment, design structure 790 may comprise a compiled, executable HDL simulation model that functionally simulates the devices to be analyzed.

Design structure 790 may also employ a data format used for the exchange of layout data of integrated circuits and/or symbolic data format (e.g. information stored in a GDSII (GDS2), GL1, OASIS, map files, or any other suitable format for storing such design data structures). Design structure 790 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described herein (e.g., .lib files). Design structure 790 may then proceed to a stage 795 where, for example, design structure 790: proceeds to tape-out, is released to manufacturing, is released to a mask house, is sent to another design house, is sent back to the customer, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
at an end point of physical design synthesis optimization flow for a putative integrated circuit design having a plurality of nets, identifying at least one congested region in said putative integrated circuit design;
identifying those of said nets of said putative integrated circuit design traversing through said at least one congested region, to obtain a plurality of candidate nets for demotion;
demoting a plurality of selected nets, selected from said plurality of candidate nets for demotion, from an upper routing layer of said putative integrated circuit design to a lower routing layer of said putative integrated circuit design, wherein at least some of said plurality of selected nets experience a loss of timing quality of result after said demoting; and
limiting negative impact to timing closure of said putative integrated circuit design by selecting said plurality of selected nets from said plurality of candidate nets for demotion and by refraining from demotion based on a constraint of not introducing any new net timing slacks below a predetermined limit to said putative integrated circuit design during said demoting, wherein said not introducing any new net timing slacks below said predetermined limit to said putative integrated circuit design during said demoting comprises not demoting a given one of said plurality of candidate nets for demotion responsive to determining that:
a timing slack of said given one of said candidate nets for demotion before demotion less a timing slack of said given one of said candidate nets for demotion after demotion would exceed a predetermined technology-dependent constant; and
said timing slack of said given one of said candidate nets for demotion after demotion would be less than a scaled worst overall latch-to-latch slack.

2. The method of claim 1, said limiting negative impact to said timing closure of said putative integrated circuit design by selecting said plurality of selected nets from said plurality of candidate nets for demotion, by refraining from said demotion based on constraints of:

not introducing any new electrical violations to said putative integrated circuit design during said demoting; and not worsening any existing electrical violations in said putative integrated circuit design during said demoting.

3. The method of claim 1, further comprising identifying at least one gate, with a critical slack, that is connected to said at least one demoted net demoted in said step of demoting said plurality of selected nets, and moving said at least one gate from a suboptimal location to an optimal location.

4. The method of claim 1, further comprising identifying at least one gate, with a critical slack, that is connected to said at least one demoted net demoted in said step of demoting said plurality of selected nets, and changing said at least one gate from a suboptimal size to an optimal size.

5. The method of claim 1, further comprising, subsequent to said demoting step, selectively promoting selected individual demoted nets demoted in said step of demoting said plurality of selected nets, as needed to close timing, while making only one next-highest wiring level available at a time.

6. The method of claim 1, wherein said limiting negative impact to said timing closure of said putative integrated circuit design by selecting said plurality of selected nets from said plurality of candidate nets for demotion, by refraining from said demotion based on a constraint of not demoting when an influence metric of a given one of said candidate nets for demotion exceeds a predetermined influence threshold.

7. The method of claim 1, wherein said steps of identifying said at least one congested region, identifying those of said nets of said putative integrated circuit design traversing through said at least one congested region, and demoting said plurality of selected nets, are carried out within a timing closure step of an electronic design automation process.

8. The method of claim 1, wherein said plurality of selected nets demoted in said demoting step comprise at least fifty percent of said plurality of candidate nets for demotion.

9. The method of claim 1, further comprising making at least one design change to said putative integrated circuit design based on said demoting of said plurality of selected nets.

10. The method of claim 9, further comprising:
updating said putative circuit design to reflect said at least one design change; and
fabricating a physical integrated circuit in accordance with said updated putative circuit design.

11. The method of claim 10, further comprising:
rendering said updated putative circuit design in a design language;
preparing a layout based on said updated putative circuit design rendered in said design language; and
instantiating said layout as a design structure;
wherein said physical integrated circuit is fabricated in accordance with said design structure.

12. A computer comprising:
a memory; and
at least one processor, coupled to said memory, and operative to increase the efficiency of electronic design automation by:
at an end point of physical design synthesis optimization flow for a putative integrated circuit design having a plurality of nets, identifying at least one congested region in said putative integrated circuit design;

identifying those of said nets of said putative integrated circuit design traversing through said at least one congested region, to obtain a plurality of candidate nets for demotion;

demoting a plurality of selected nets, selected from said plurality of candidate nets for demotion, from an upper routing layer of said putative integrated circuit design to a lower routing layer of said putative integrated circuit design, wherein at least some of said plurality of selected nets experience a loss of timing quality of result after said demoting; and limiting negative impact to timing closure of said putative integrated circuit design by selecting said plurality of selected nets from said plurality of candidate nets for demotion and by refraining from demotion based on a constraint of not introducing any new net timing slacks below a predetermined limit to said putative integrated circuit design during said demoting, wherein said not introducing any new net timing slacks below said predetermined limit to said putative integrated circuit design during said demoting comprises not demoting a given one of said plurality of candidate nets for demotion responsive to determining that:

a timing slack of said given one of said candidate nets for demotion before demotion less a timing slack of said given one of said candidate nets for demotion after demotion would exceed a predetermined technology-dependent constant; and said timing slack of said given one of said candidate nets for demotion after demotion would be less than a scaled worst overall latch-to-latch slack.

13. The computer of claim 12, wherein the at least one processor is further operative to increase the efficiency of electronic design automation by said limiting said negative impact to said timing closure of said putative integrated circuit design by selecting said plurality of selected nets from said plurality of candidate nets for demotion, by refraining from demotion based on constraints of:
not introducing any new electrical violations to said putative integrated circuit design during said demoting; and
not worsening any existing electrical violations in said putative integrated circuit design during said demoting.

14. The computer of claim 12, wherein the at least one processor is further operative to identify at least one gate, with a critical slack, that is connected to said at least one demoted net demoted in said demoting of said plurality of selected nets, and move said at least one gate from a suboptimal location to an optimal location.

15. The computer of claim 12, wherein the at least one processor is further operative to identify at least one gate, with a critical slack, that is connected to said at least one demoted net demoted in said demoting of said plurality of selected nets, and change said at least one gate from a suboptimal size to an optimal size.

16. The computer of claim 12, wherein the at least one processor is further operative to, subsequent to said demoting, selectively promote selected individual demoted nets demoted in said demoting of said plurality of selected nets, as needed to close timing, while making only one next-highest wiring level available at a time.

17. The computer of claim 12, wherein said at least one processor is further operative to increase the efficiency of the electronic design automation by:
making at least one design change to said putative integrated circuit design based on said demoting;

updating said putative electronic logic circuit design to reflect said at least one design change;
rendering said updated putative electronic logic circuit design in a design language;
preparing a layout based on said updated putative electronic logic circuit design rendered in said design language;
instantiating said layout as a design structure; and
providing said design structure to fabrication equipment to facilitate fabrication of a physical integrated circuit in accordance with said design structure.

18. A computer program product for increasing the efficiency of electronic design automation, the computer program product comprising:
one or more computer readable storage media, and program instructions collectively stored on the one or more computer readable storage media, the program instructions comprising:
program instructions to, at an end point of physical design synthesis optimization flow for a putative integrated circuit design having a plurality of nets, identify at least one congested region in said putative integrated circuit design;
program instructions to identify those of said nets of said putative integrated circuit design traversing through said at least one congested region, to obtain a plurality of candidate nets for demotion;
program instructions to demote a plurality of selected nets, selected from said plurality of candidate nets for demotion, from an upper routing layer of said putative integrated circuit design to a lower routing layer of said putative integrated circuit design, wherein at least some of said plurality of selected nets experience a loss of timing quality of result after said demoting; and program instructions to limit negative impact to timing closure of said putative integrated circuit design by selecting said plurality of selected nets from said plurality of candidate nets for demotion and by refraining from demotion based on a constraint of not introducing any new net timing slacks below a predetermined limit to said putative integrated circuit design during said demoting, wherein said not introducing any new net timing slacks below said predetermined limit to said putative integrated circuit design during said demoting comprises not demoting a given one of said plurality of candidate nets for demotion responsive to determining that:
a timing slack of said given one of said candidate nets for demotion before demotion less a timing slack of said given one of said candidate nets for demotion after demotion would exceed a predetermined technology-dependent constant; and
said timing slack of said given one of said candidate nets for demotion after demotion would be less than a scaled worst overall latch-to-latch slack.

* * * * *